US008041987B2

(12) United States Patent
Allen et al.

(10) Patent No.: US 8,041,987 B2
(45) Date of Patent: Oct. 18, 2011

(54) DYNAMIC PHYSICAL AND VIRTUAL MULTIPATH I/O

(75) Inventors: James P. Allen, Austin, TX (US);
Robert G. Kovacs, Austin, TX (US);
James A. Pafumi, Leander, TX (US);
James B. Partridge, Bastrop, TX (US);
Jacob J. Rosales, Austin, TX (US);
Stephen M. Tee, Marble Falls, TX (US)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 12/268,238

(22) Filed: Nov. 10, 2008

(65) Prior Publication Data
US 2010/0122111 A1 May 13, 2010

(51) Int. Cl.
*G06F 11/00* (2006.01)
(52) U.S. Cl. .................. 714/5.11; 714/4.11; 714/43
(58) Field of Classification Search .......... 714/9, 43, 714/56, 4.11, 5.11, 44
See application file for complete search history.

(56) References Cited

U.S. PATENT DOCUMENTS

| | | | | |
|---|---|---|---|---|
| 7,711,978 | B1 * | 5/2010 | Roy et al. .......................... | 714/4 |
| 7,711,979 | B2 * | 5/2010 | Salli ................................. | 714/4 |
| 7,778,157 | B1 * | 8/2010 | Tawri et al. .................... | 370/216 |
| 7,783,779 | B1 * | 8/2010 | Scales et al. .................. | 709/240 |
| 7,793,139 | B2 * | 9/2010 | Jain et al. ...................... | 714/4.2 |
| 2004/0078632 | A1 * | 4/2004 | Infante et al. .................... | 714/5 |
| 2006/0195663 | A1 * | 8/2006 | Arndt et al. .................... | 711/153 |
| 2007/0147267 | A1 | 6/2007 | Holland | |
| 2007/0174851 | A1 | 7/2007 | Smart | |
| 2008/0127326 | A1 | 5/2008 | Dugan et al. | |
| 2009/0089611 | A1 * | 4/2009 | Arndt et al. .................. | 714/5.11 |
| 2009/0307378 | A1 * | 12/2009 | Allen et al. ....................... | 710/4 |

FOREIGN PATENT DOCUMENTS

KR  2003-0030148  4/2003

OTHER PUBLICATIONS

Srikrishnan, et al., "Sharing FCP Adaptors Through Virtualization," IBM J. Res. & Dev., vol. 51, No. 1/2, Jan./Mar. 2007, pp. 103-118.

* cited by examiner

*Primary Examiner* — Robert Beausoliel, Jr.
*Assistant Examiner* — Elmira Mehrmanesh
(74) *Attorney, Agent, or Firm* — Stephen J. Walder, Jr.; Libby Z. Toub

(57) ABSTRACT

Embodiments that dynamically manage physical and virtual multipath I/O are contemplated. Various embodiments comprise one or more computing devices, such as one or more servers, having at least two HBAs. At least one of the HBAs may be associated with a virtual I/O server that employs the HBA to transfer data between a plurality of virtual clients and one or more storage devices of a storage area network. The embodiments may monitor the availability of the HBAs, such as monitoring the HBAs for a failure of the HBA or a device coupled to the HBA. Upon detecting the unavailability of one of the HBAs, the embodiments may switch, dynamically, from the I/O path associated with the unavailable HBA to the alternate HBA.

24 Claims, 5 Drawing Sheets

DYNAMIC PHYSICAL AND VIRTUAL MULTIPATH I/O

BACKGROUND

The present disclosure relates generally to computing and information storage devices and more particularly to dynamic physical and virtual multipath input/output (I/O) of computing and information storage devices. Common types of computing devices are desktop computers and server systems. As for information storage, an increasingly common technology is referred to as storage area networking, or simply storage area network (SAN). SAN technology comprises connecting remote computer storage devices, such as disk arrays and optical storage arrays, to servers and other computing devices in such a way that the storage devices appear as locally attached devices to the computing devices and the operating system which share the storage devices.

Fibre channel switches often connect servers and other computing devices to SANs. In a conventional fibre channel SAN, an Input/Output Controller (IOC) or Host Bus Adapter (HBA) includes an N_Port connected to a fibre channel switch or Just a Bunch Of Disks (JBOD) via a fibre channel link. During initialization, a driver of a host operating system (OS) initializes a fibre channel sequence and causes the HBA to send a Fabric Login command (FLOGI) to the fibre channel switch, including a World-Wide Port Name (WWPN) for the N_Port. The fibre channel switch returns a FLOGI response to the N_Port, including a fibre channel address or virtual identifier (virtual ID) associated with the WWPN for the N_Port.

The driver also performs a discovery function in which it communicates with the fibre channel switch via the HBA and obtains a list of the addresses of all devices in the fabric. The discovery function then includes going out to every address, logging into the device associated with that address, and determining if the device is a fibre channel/Small Computer System Interface (SCSI) target. If the device is a fibre channel/SCSI target, the discovery function establishes a connection between the target and the HBA. In addition, the physical fibre channel link is exported as a SCSI bus to the OS, and the remote port associated with the discovered FC/SCSI device thereafter appears as a target on the SCSI bus in a conventional SCSI fashion.

Conventional fibre channel SANs are limited because only one WWPN and fibre channel address can be assigned to the N_Port on a single fibre channel link. In other words, a conventional computing model contemplates a single OS per computing device, such that the OS explicitly owns the fibre channel port. Consequently, system management tools have been defined, such as zoning and selective storage presentation/Logical Unit Number (LUN) masking, based on the fibre channel port.

Fibre channel SAN technology has been extended, however, to include N_Port ID Virtualization (NPIV). NPIV is a standardized method for virtualizing a physical fibre channel port. NPIV allows a fabric-attached N_Port to claim multiple fibre channel addresses. Each address appears as a unique entity on the fibre channel fabric. Utilizing NPIV, multiple WWPNs and fibre channel addresses recognizable by the fibre channel switch can be assigned to a single physical fibre channel link and N_Port. Allowing the physical fibre channel port to appear as multiple entities to the fabric therefore extends or expands the conventional computing model.

Engineers have improved the fault-tolerance and performance of SANs by creating multiple physical paths, between physical processors of computing devices and the SANs. The multiple physical paths generally involve creating I/O paths through such devices as multiple buses, multiple controllers, multiple switches, and multiple bridge devices. The technique of creating multiple paths is typically referred to as multipath I/O. Existing implementations of multipath I/O use dedicated physical resources, such as dedicated fibre channel host bus adapters, switch ports, cables, and other physical resource elements.

BRIEF SUMMARY

Following are detailed descriptions of embodiments depicted in the accompanying drawings. The descriptions are in such detail as to clearly communicate various aspects of the embodiments. However, the amount of detail offered is not intended to limit the anticipated variations of embodiments. On the contrary, the intention is to cover all modifications, equivalents, and alternatives of the various embodiments as defined by the appended claims. The detailed descriptions below are designed to make such embodiments obvious to a person of ordinary skill in the art.

Generally speaking, methods, apparatuses, systems, and computer program products to dynamically manage physical and virtual multipath I/O are contemplated. Various embodiments comprise one or more computing devices, such as one or more servers, having at least two HBAs. At least one of the HBAs may be associated with a virtual I/O server that employs the HBA to transfer data between a plurality of virtual clients and one or more storage devices of a storage area network. The embodiments may monitor the availability of the HBAs, such as monitoring the HBAs for a failure of the HBA or a device coupled to the HBA. Upon detecting the unavailability of one of the HBAs, the embodiments may switch, dynamically, from the I/O path associated with the unavailable HBA to the alternate HBA.

Some embodiments comprise a method that includes enabling a virtual client to transfer data between a storage device of a storage network and the virtual client via a first physical HBA, enabling a virtual I/O server to transfer data between the storage device and the virtual I/O server via a second physical HBA, and enabling, dynamically, the virtual client to transfer data between the storage device and the virtual client via the virtual I/O server and the second physical HBA.

Further embodiments comprise apparatuses having a virtual client module to transfer data to a network via a first physical HBA and a virtual I/O server module to transfer data to the network via a second physical HBA. The embodiments also have a virtual machine monitor to couple the virtual client module to the virtual I/O server module. Of these embodiments, the virtual I/O server may be configured to enable the virtual client to access the second physical HBA as a virtual HBA. Additionally, the virtual client module, the virtual I/O server, or the virtual machine monitor may be configured to dynamically enable the virtual client module to transfer data to the network via the second physical HBA.

Further embodiments comprise systems having a virtual client module that transfers data to a SAN via a first fibre channel HBA, a virtual I/O server module that transfers data to the SAN via a second fibre channel HBA, and a virtual machine monitor that couples the virtual client module to the virtual I/O server module. Of the system embodiments, the virtual I/O server enables the virtual client to access the second fibre channel HBA as a virtual fibre channel HBA. The system embodiments further comprise a multipath I/O module of the virtual client module to dynamically enable the virtual client module to transfer data to the SAN via the first fibre channel HBA upon a failure of the second fibre channel HBA Further embodiments comprise a computer program product comprising a computer usable medium having a computer readable storage medium including instructions that, when executed by at least one processor transfer data to a network of storage devices via a first physical HBA and transfer data to the network via a second physical HBA. The instructions may transfer data to the network via the second physical HBA for a plurality of virtual clients, with the second physical HBA configured as a virtual HBA. The instructions may further enable, dynamically, a virtual client of the plurality to access the network via one of the first physical HBA and the second physical HBA upon a failure of the one of the first physical HBA and the second physical HBA.

BRIEF DESCRIPTION OF THE SEVERAL VIEWS OF THE DRAWING

Aspects of the various embodiments will become apparent upon reading the following detailed description and upon reference to the accompanying drawings in which like references may indicate similar elements.

DETAILED DESCRIPTION

The following is a detailed description of novel embodiments depicted in the accompanying drawings. The embodiments are in such detail as to clearly communicate the subject matter. However, the amount of detail offered is not intended to limit anticipated variations of the described embodiments. To the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

In many of the following paragraphs, numerous embodiments are discussed using the term "server". The terms "computing device" are also used. Even so, the use of these terms is for the sake of explanation for those possessing ordinary skill in the art. The teachings herein may generally be employed with numerous types of computing devices coupled to networks, including SANs.

Figure 1:
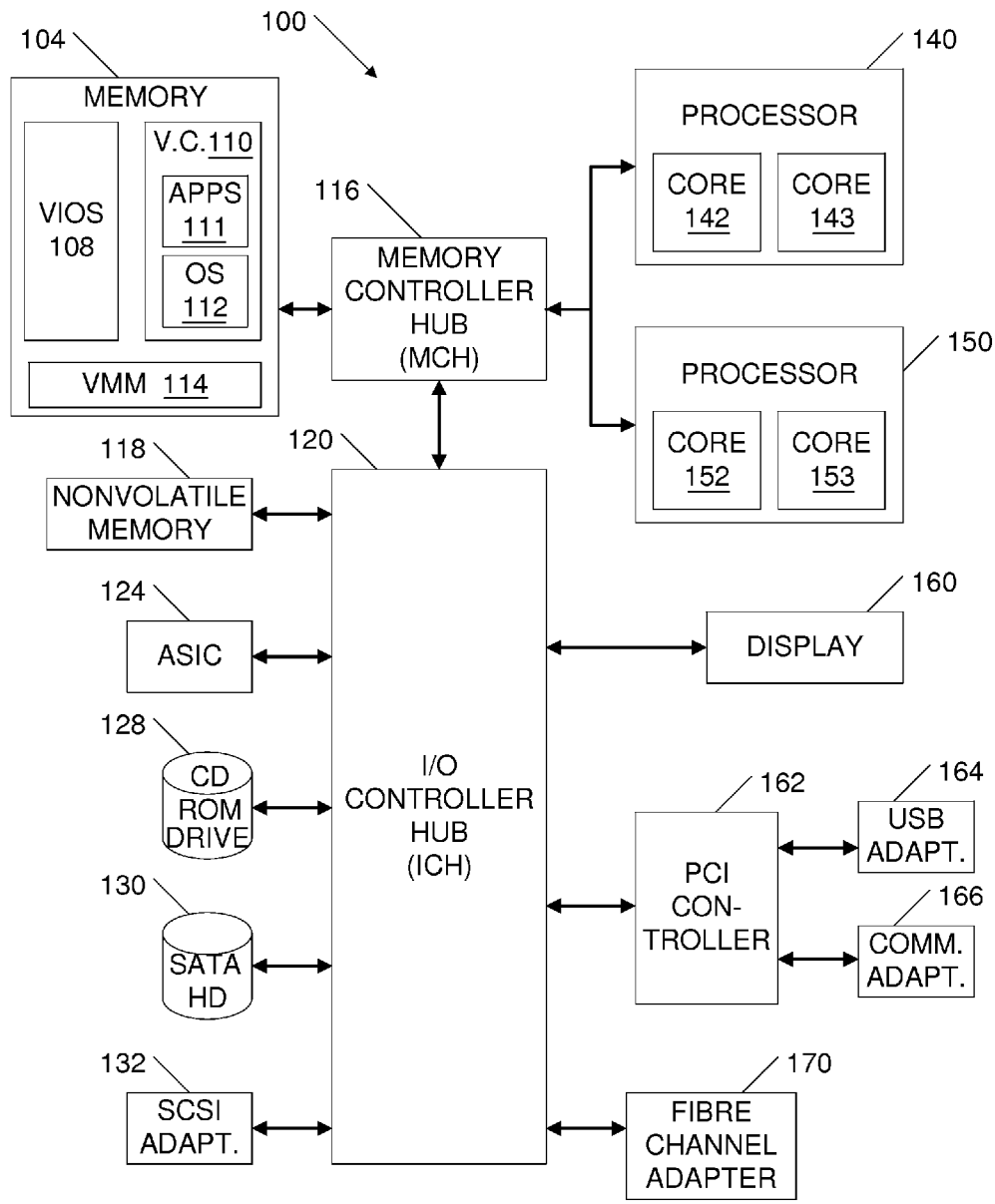
FIG. 1 depicts an embodiment of a system that may perform dynamic management of physical and virtual multipath I/O, comprising two processors, a virtual machine monitor, a display, and various input-output devices.

Turning now to the drawings, FIG. 1 depicts a system 100 with two processors, 140 and 150, a memory controller hub (MCH) 116, memory 104, and an I/O controller hub (ICH) 120. In numerous embodiments system 100 may comprise a server. In other embodiments system 100 may comprise a different type of computing device, such as a mainframe computer or part of a mainframe computer system, a desktop computer, or a notebook computer.

Processors 140 and 150 may have a number of cores, such as cores 142, 143, 152, and 153, which may be coupled with cache memory elements of processors 140 and 150. For example, processor 150 may have cores 152 and 153 coupled with internal processor cache memory. The number of processors and the number of cores may vary from embodiment and embodiment. For example, while system 100 has two processors, 140 and 150, alternative embodiments may have other numbers of processors, such as one, four, eight, or some other number. The number of cores of a processor may also vary in different embodiments, such as one core, four cores, five cores, or some other number of cores.

As depicted in FIG. 1, system 100 may execute a number of applications, such as applications 111, in one or more virtual clients of memory 104, such as virtual client 110. For example, system 100 may comprise part of a larger server system, such as a computing board, or blade server, in a rack-mount server. Processors 140 and 150 may execute operating instructions for programs and applications 111 executed by users of system 100. Applications 111 may comprise, e.g., a network mail program and several productivity applications, such as a word processing application and a computer aided design (CAD) application.

Processors 140 and 150 may execute the instructions in memory 104 by interacting with MCH 116. The types of memory devices comprising memory 104 may vary in different embodiments. In some embodiments, memory 104 may comprise volatile memory elements, such as four 4-gigabyte (GB) dynamic random access memory (DRAM) sticks. Some embodiments may comprise smaller or larger amounts of memory. For example, some embodiments may comprise 128 GB of RAM, while other embodiments may comprise even more memory, such as 512 GB. In alternative embodiments, memory 104 may comprise nonvolatile memory. For example in some embodiments memory 104 may comprise a flash memory module, such as a 64 GB flash memory module.

Also as depicted in FIG. 1, system 100 may have a virtual machine monitor 114, such as a hypervisor, that manages one or more virtual machines, such as virtual client 110 and virtual I/O server 108. In other words, virtual machine monitor 114 may allow multiple operating systems to simultaneously run on system 100. In the embodiment of FIG. 1, virtual machine monitor 114 may comprise an application loaded into memory 104, separate from any operating system.

In different embodiments, virtual machine monitor 114 may exist in different forms. For example, in one embodiment virtual machine monitor 114 may comprise firmware coupled to processor 140 or processor 150. In another embodiment, virtual machine monitor 114 may comprise a software application loaded as part of or after an operating system. That is to say, virtual machine monitor 114 may comprise an application being executed by an operating system. Some embodiments may have no separate virtual machine monitor, in which case the operating system may perform the functions of a virtual machine monitor or hypervisor. The number of virtual machines may also vary from embodiment to embodiment.

Virtual client 110 and virtual I/O server 108 may each comprise collections of software programs that form self-contained operating environments. Virtual client 110 and virtual I/O server 108 may operate independently of, but in conjunction with, virtual machine monitor 114. For example, virtual I/O server 108 may work in conjunction with virtual machine monitor 114 to allow virtual client 110 and other virtual clients to interact with various physical I/O hardware elements.

ICH 120 may allow processors 140 and 150 to interact with external peripheral devices, such as keyboards, scanners, and data storage devices. Programs and applications being executed by processors 140 and 150 may interact with the external peripheral devices. For example, processors 140 and 150 may present information to a user via a display 160 coupled to, e.g., an Advanced Graphics Port (AGP) video card. The type of console or display device may be a cathode-ray tube (CRT) monitor, a liquid crystal display (LCD) screen, or a thin-film transistor flat panel monitor, as examples.

Display 160 may allow a user to view and interact with applications 111. For example, display 160 may allow the user to execute a CAD program of applications 111 and store drawing information to a storage area network coupled to system 100 via a fibre channel adapter 170. Alternative embodiments of system 100 may comprise numerous fibre channel adapters 170. Additionally, in some embodiments, the user or a system administrator may also use display 160 to view and change configuration information of virtual machine monitor 114, virtual I/O server 108, and virtual client 110. For example, the system administrator may set up partitioning information for numerous virtual machines to be managed by virtual machine monitor 114.

In various embodiments, ICH 120 may allow processors 140 and 150 to store data to and retrieve data from storage devices of a storage area network via one or more fibre channel devices. For example, system 100 may allow applications 111 to store data to a SAN via a SAN switch coupled to fibre channel adapter 170. Virtual client 110 may be configured to have a dedicated storage device attached to fibre channel adapter 170. In the event of a failure of an element coupled to fibre channel adapter 170, such as a SAN switch, virtual client 110 may nonetheless store and/or retrieve information via virtual I/O server 108, virtual machine monitor 114, and an alternate storage device, such as another SAN switch coupled to another fibre channel adapter via ICH 120.

In alternative embodiments, ICH 120 may allow processors 140 and 150 to store and retrieve data from one or more universal serial bus (USB) devices via Peripheral Component Interconnect (PCI) controller 162 and a USB device coupled to USB adapter 164. In an embodiment, virtual client 110 may be configured to store and/or retrieve information via virtual I/O server 108, virtual machine monitor 114, and a primary USB hard drive coupled with USB adapter 164. In the event of a failure of an element of the primary USB hard drive, virtual client 110 may nonetheless store and/or retrieve information via a dedicated secondary USB hard drive, attached to USB adapter 164 or a secondary USB adapter.

Processors 140 and 150 may also send and receive data via PCI controller 162 and communication adapter 166. Communication adapter 166 may comprise, e.g., a network interface card (NIC). System 100 may allow one or more executing applications 111 to transfer data between virtual client 110 and a hard disk of an Internet Small Computer Systems Interface (iSCSI) SAN. For example, system 100 may have several virtual clients situated in one or more logical partitions (LPARs). Virtual client 110 may reside in one logical partition and virtual I/O server 108 may reside in a second logical partition. System 100 may enable virtual client 110 to communicate with and transfer information to/from a primary iSCSI hard disk using communication adapter 166 via an associated NIC. The embodiment of system 100 may allow virtual client 110 to transfer information to/from a secondary iSCSI hard disk using a secondary communication adapter and a secondary NIC coupled to virtual I/O server 108, in the event of a failure or maintenance of the primary iSCSI hard disk or an interconnecting network device between the iSCSI hard disk and communication adapter 166.

Alternative embodiments may employ different technologies for communication adapter 166 differently. For example one embodiment may utilize a virtual fiber-optic bus while another embodiment may employ a high-speed link (HSL) optical connection for communication adapter 166.

In addition to USB adapter 164 and communication adapter 166, ICH 120 may also allow applications 111 of system 100 to interact with Advanced Technology Attachment (ATA) devices, such as ATA hard drives, digital versatile disc (DVD) drives, and compact disc (CD) drives, like CD read only memory (ROM) drive 128. As shown in FIG. 1, system 100 may have a Serial ATA (SATA) drive, such as SATA hard drive 130. SATA hard drive 130 may be used, e.g., to store numerous operating systems for various partitions, device drivers, and application software for virtual clients of system 100. For example, SATA hard drive 130 may store AIX®, Linux®, Macintosh® OS X, Windows®, or some other operating system that system 100 loads into one or more LPARs.

In various embodiments, ICH 120 may allow applications in partitions managed by virtual machine monitor 114 to store and retrieve information in nonvolatile memory 118, as well as interact with an application specific integrated circuit (ASIC) 124. For example, nonvolatile memory 118 may comprise flash memory in some embodiments while comprising programmable read-only memory (PROM) or another type of memory in other embodiments. Nonvolatile memory may be used, e.g., to store primary and secondary virtual/physical I/O path information, such as which specific physical and virtual fibre channel adapters a virtual client is configured to use. ICH 120 may also allow applications in partitions managed by virtual machine monitor 114 to store and retrieve data using a SCSI device coupled to SCSI adapter 132.

Alternative embodiments may also dynamically manage physical and virtual multipath I/O in a system 100 having different types of hardware not depicted in FIG. 1, such as a sound card, a scanner, and a printer, as examples. For example, system 100 may be in the process of transferring data from a scanner and storing the data to a SAN network connected via a SAN switch coupled to fibre channel 170, encounter a problem with the SAN switch, and enable failover, via virtual I/O server 108, to another SAN switch coupled to the SAN network. Conversely, in different embodiments, system 100 may not comprise all of the elements illustrated for the embodiment shown in FIG. 1. For example, some embodiments of system 100 may not comprise one or more of SCSI adapter 132, PCI controller 162, USB adapter 164, CD-ROM drive 128, and ASIC 124.

Figure 2:
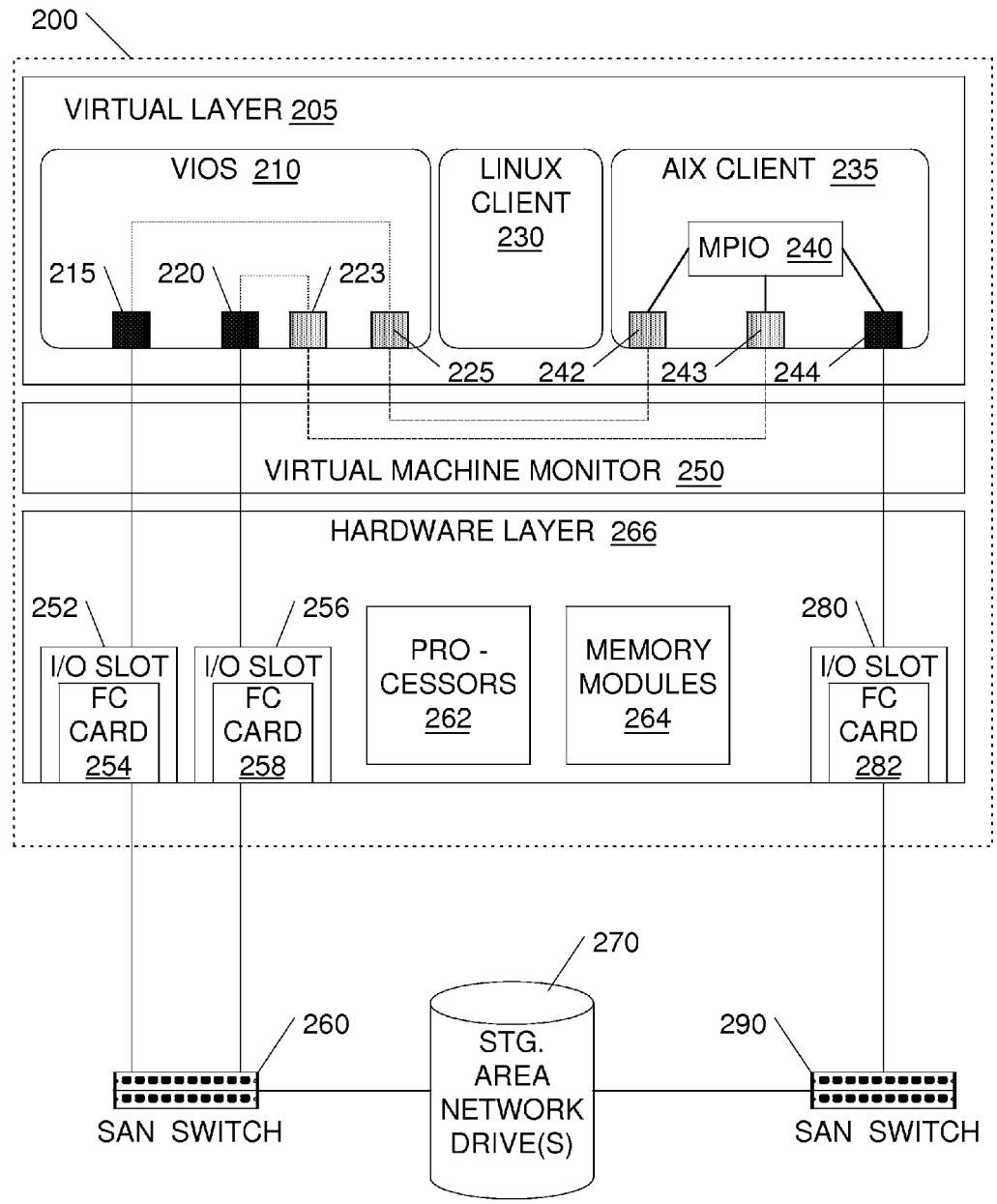
FIG. 2 illustrates how an embodiment may dynamically manage multipath I/O between a physical fibre channel card coupled directly to a virtual client and one or more physical fibre channel cards coupled via a virtual I/O server.

To provide a more detailed illustration of how a system or an apparatus 200 may dynamically manage physical and virtual multipath I/O, we turn now to FIG. 2. FIG. 2 illustrates how an embodiment may dynamically manage I/O for physical and virtual fibre channels coupled to a SAN 270. For example, virtual machine monitor 250 and processors 262 may comprise elements of an apparatus or a system, such as virtual machine monitor 114 and processors 140 and 150, respectively, in FIG. 1.

Virtual machine monitor 250 may enable one or more elements of hardware layer 266 to be divided into multiple logical partitions and ensure isolation between the partitions. For example, virtual machine monitor 250 may always operate whenever apparatus 200 operates, dispatching logical partition workloads of virtual machine clients and virtual I/O servers across shared physical processors of processors 262. FIG. 2 depicts two virtual clients, Linux® client 230 and AIX® client 235, each client in a separate logical partition. Virtual machine monitor 250 may also enforce partition security and provide inter-partition communication that enables virtual SCSI and virtual Ethernet functionality for virtual I/O server 210.

Virtual machine monitor 250 may provide an abstraction layer between the physical hardware resources of hardware layer 266 and the logical partitions using the physical hardware resources. Virtual machine monitor 250 may control the dispatch of virtual processors to physical processors 262, save/restore processor state information during virtual processor context switches, and control hardware I/O interrupts and management facilities for partitions. Further, virtual machine monitor 250 may provide remote direct memory access (RDMA) services for logical partitions of apparatus 200. For example, virtual machine monitor 250 may enable data to move directly from clients of virtual layer 205, which may comprise a section of memory in memory modules 264, to I/O slots 252 and 256 and fibre channel cards 254 and 258 without needing to copy data between application memory of the partitions to data buffers of the operating systems for the partitions.

Apparatus 200 comprises two virtual machine clients, Linux® client 230 and AIX® client 235, represented in virtual layer 205. For example, Linux® client 230 may reside in one LPAR, while AIX® client 235 resides in another LPAR. An LPAR of apparatus 200 may refer to a logical grouping, or partitioning, of microprocessor resources, memory resources, and I/O resources.

The amount of resources may vary in different embodiments, and even within a single embodiment, according to resource need and resource availability within the apparatus. For example, one or more LPARs may comprise shared-processor partitions, alternatively referred to as micro-partitions, such that apparatus 200 allocates processor resources from a single pool of physical processors to the LPARs. Depending on the embodiment, the amount of processor capacity that apparatus 200 allocates a micro-partition may range from, for example, ten percent (10%) of a physical processor up to the entire capacity of the physical shared processor pool. In many embodiments, each virtual machine, such as virtual I/O server 210 or AIX® client 235, may be executed in either a dedicated processor partition or a micro-partition.

As FIG. 2 illustrates, an apparatus may have numerous I/O slots, such as I/O slots 252, 256, and 280. One or more of I/O slots 252, 256, and 280 may comprise, as an example, an 8 Gb PCIe host bus adapter I/O slot. While FIG. 2 only illustrates apparatus 200 having only three I/O slots, alternative embodiments may have fewer or more I/O slots. For example, an embodiment may comprise eight, sixteen, thirty-two, or even more I/O slots. Each of the I/O slots of apparatus 200 has a fibre channel interface card. I/O slot 252 is coupled to fibre channel card 254, while I/O slots 256 and 280 are coupled to fibre channel cards 258 and 282, respectively.

Depending on the embodiment, a virtual I/O server may employ one or more of fibre channel cards, host controllers, host adapters, and host bus adapters (HBAs) to connect an apparatus or a host system to other network and storage devices. The card/adapter terms used above may refer to devices for connecting SCSI, fibre channel, and eSATA devices. Additionally, persons having ordinary skill in the art may often use such terms as "host adapters" to refer to devices connecting a host system to IDE, Ethernet, FireWire, USB and other systems. Even further, some embodiments may employ such elements as Ethernet HBAs, with the introduction of iSCSI, which are different from Ethernet NICs in that Ethernet HBAs may include hardware iSCSI-dedicated TCP Offload Engines. Different embodiments may employ one or more of each of the different types of devices for network and storage device connections when dynamically managing physical and virtual multipath I/O.

An administrator of apparatus 200 may configure AIX® client 235 and/or virtual machine monitor 250, dedicating I/O slot 280 and fibre channel card 282 to AIX® client 235. For example, virtual machine monitor may be configured to allow only AIX® client 235 to communicate with SAN switch 290 via I/O slot 280 and fibre channel card 282, preventing other virtual clients like Linux® client 230 from accessing or using I/O slot 280 and fibre channel card 282.

In numerous embodiments, a virtual I/O server like virtual I/O server 210 may provide virtual SCSI targets and shared Ethernet capability to Linux® client 230 and AIX® client 235, allowing Linux® client 230 and AIX® client 235 to share SCSI devices and Ethernet adapters. For example, an administrator of apparatus 200 may configure virtual I/O server 210 and/or virtual machine monitor 250 in a manner to dedicate I/O slot 252 with fibre channel card 254 and I/O slot 256 with fibre channel card 258 to virtual I/O server 210. Arranged in the manner depicted in FIG. 2, virtual I/O server 210 may allow virtualization of physical storage resources of SAN 270. Client partitions of apparatus 200 may access physical storage devices of SAN 270, represented as virtualized storage devices to the client partitions by virtual I/O server 210. In other words, apparatus 200 may enable client partitions, such as Linux® client 230 and AIX® client 235, to access virtual SCSI devices as standard SCSI compliant logical units (LUNs).

Coupling NPIV with the adapter sharing capabilities of virtual I/O server 210, apparatus 200 may enable physical fibre channel host bus adapters, such as fibre channel cards 254 and 258, to be shared across multiple guest, or client, operating systems, such as Linux® client 230 and AIX® client 235. In other words, apparatus 200 may implement NPIV for fibre channel cards 254 and 258, enabling LPARs to each have virtual fibre channel HBAs with a dedicated WWPN. Each virtual fibre channel HBA may have a unique SAN identity which may be compared with a SAN identity of a dedicated physical HBA.

Apparatus 200 may also employ NPIV to dynamically manage physical and virtual multipath I/O, enabling redundancy of shared resources. Apparatus 200 may employ dynamic physical and virtual multipath I/O to improve data availability by providing multiple paths from an LPAR to a storage device. For example, the embodiment of apparatus 200 depicted in FIG. 2 provides two different paths from virtual I/O server 210 to SAN 270. If, for example, fibre channel card 254 were to fail, virtual I/O server 210 may nonetheless continue sending data to SAN 270 via I/O slot 256, fibre channel card 258, and SAN switch 260.

Additionally, virtual I/O server 210 may activate both paths of I/O slots 252 and 256 to spread or balance I/O workload across the paths and improve performance of apparatus 200. For example, data transfer from virtual I/O server 210 to SAN 270 may be limited to an average of 7.5 Gb/s using only I/O slot 256 and fibre channel card 258. However, provided no virtual client accesses I/O slot 252, virtual I/O server 210 may increase the transfer rate to an average of 15 Gb/s by operating I/O slots 252 and 256 in tandem.

Apparatus 200 enables AIX® client 235 and Linux® client 230 to support both physical and virtual I/O, which may in turn enable apparatus 200 to implement dynamic physical and virtual multipath I/O. In other words, by dynamically managing physical and virtual multipath I/O, apparatus 200 may create both physical and virtual paths from LPARs to a storage device. For example, a physical path may comprise a dedicated fibre channel adapter. In FIG. 2, a physical path from AIX® client 235 may comprise the path through virtual machine monitor 250 from physical fibre channel HBA driver 244 to I/O slot 280 and fibre channel card 282, to SAN switch 290, and to SAN 270. A virtual path from AIX® client 235 may comprise the path through virtual machine monitor 250 from NPIV adapter driver 242 to NPIV adapter driver 225, to physical fibre channel HBA driver 215, through virtual machine monitor 250 to I/O slot 252 and fibre channel card 254, to SAN switch 260 and SAN 270.

For dynamic management of physical and virtual multipath I/O, during initialization physical fibre channel HBA driver 215 may initiate a fibre channel initialization sequence and cause fibre channel card 254 to send a Fabric Login command (FLOGI) to SAN switch 260, including a World-Wide Port Name (WWPN) for the N_Port of fibre channel card 254. SAN switch 260 may return a FLOGI response to the N_Port of fibre channel card 254, including a FC address associated with the WWPN for the N_Port.

Physical fibre channel HBA driver 215 may also perform a discovery function in which physical fibre channel HBA driver 215 communicates with SAN switch 260 via fibre channel card 254 and obtains a list of the addresses of all devices in the fabric associated with SAN switch 260. Physical fibre channel HBA driver 215 may then query every address, log into each of the devices associated with each of the addresses, and determine if the device is a fibre channel/SCSI target. If the device is a fibre channel/SCSI target, physical fibre channel HBA driver 215 may establish a connection between the target and fibre channel card 254. In addition, physical fibre channel HBA driver 215 may then represent each associated physical fibre channel link, between fibre channel card 254 and SAN switch 260, as a SCSI bus to virtual clients of virtual layer 205, with the remote port associated with the discovered fibre channel/SCSI device thereafter appearing as a target on the SCSI bus.

Apparatus 200 may employ NPIV to enable the N_Port of fibre channel card 254 to claim multiple fibre channel addresses. For example, physical fibre channel HBA driver 215 may claim one fibre channel address for AIX® client 235 and a second fibre channel address for Linux® client 230. Each address may appear as a unique entity for the fibre channel fabric. In other words, by utilizing NPIV, multiple WWPNs and fibre channel addresses recognizable by SAN switch 260 may be assigned to a single physical FC link and N_Port. Additionally, virtual I/O server 210 and AIX® client 235 may each comprise virtual device drivers, such as NPIV adapter driver 225 and NPIV adapter driver 242, respectively, wherein the virtual device drivers are capable of supporting NPIV.

Assigning multiple WWPNs and fibre channel addresses to a single physical N_Port may allow apparatus 200 to execute multiple virtual clients with independent operating systems. Instead of dedicating the port of fibre channel card 254 to a single virtual client, each operating system of each virtual client may uniquely have one or more unique and dedicated fibre channel addresses, along with associated unique WWPNs for each fibre channel address. Using NPIV, apparatus 200 may also enable the N_Ports of other fibre channel cards, such as fibre channel card 258, to claim multiple fibre channel addresses.

Apparatus 200 may employ dynamic physical and virtual multipath I/O to increase I/O redundancy by utilizing less physical resources. For example, instead of AIX® client 235 requiring two dedicated physical I/O slots for redundant I/O, AIX® client 235 may use one dedicated physical I/O slot and associated HBA, yet provide a failover path to a virtual HBA associated with VIOS 210. A more detailed example may help illustrate this concept of dynamic physical and virtual multipath I/O.

As depicted in FIG. 2, apparatus 200 may have AIX® client 235 configured with a single dedicated physical fibre channel HBA, comprising fibre channel card 282 coupled with physical fibre channel HBA driver 244. Fibre channel card 282 and physical fibre channel HBA driver 244 may comprise the primary I/O channel that AIX® client 235 uses to store data to, as well as retrieve data from, SAN 270.

AIX® client 235 may also be configured with two virtual fibre channel HBAs, comprising NPIV adapter driver 242 and NPIV adapter driver 243. For example, one virtual fibre channel I/O path between AIX® client 235 and virtual I/O server 210 may comprise the virtual path provided by virtual machine monitor 250 between NPIV adapter driver 242 and NPIV adapter driver 225. The second virtual fibre channel I/O path may comprise the virtual path provided by virtual machine monitor 250 between NPIV adapter driver 243 and NPIV adapter driver 223.

NPIV adapter driver 225 may couple with physical fibre channel HBA driver 215, enabling virtual I/O server 210 to transfer data between apparatus 200 and SAN 270 via I/O slot 252, fibre channel card 254, and SAN switch 260. NPIV adapter driver 223 may couple with physical fibre channel HBA driver 220, enabling virtual I/O server 210 to transfer data between apparatus 200 and SAN 270 via I/O slot 256, fibre channel card 258, and SAN switch 260. NPIV adapter drivers 225 and 223, physical fibre channel HBA drivers 215 and 220, and fibre channel cards 254 and 258, may comprise the secondary and tertiary I/O channels that AIX® client 235 uses to store data to, as well as retrieve data from, SAN 270.

Multipath I/O module 240 may identify the various physical fibre channel HBA and virtual fibre channel HBA I/O data paths that AIX® client 235 is configured to use. Further, multipath I/O module 240 may dynamically detect failures of the individual physical and virtual I/O data paths and enable AIX® client 235 to dynamically failover to alternate I/O data paths. For example, during one mode of operation, AIX® client 235 may use the primary I/O channel, represented by physical fibre channel HBA driver 244, to transfer data between AIX® client 235 and SAN 270.

In the event of a failure or maintenance, such as SAN switch 290 experiencing a hardware problem, multipath I/O module 240 may detect the failure associated with physical fibre channel HBA driver 244 and switch the primary I/O channel for AIX® client 235 from physical fibre channel HBA driver 244 to the secondary I/O channel associated with NPIV adapter driver 242. Further, in the event of a failure of the secondary I/O channel, multipath I/O module 240 may also detect the failure and switch the currently active I/O channel for AIX® client 235 from NPIV adapter driver 242 to the tertiary I/O channel associated with NPIV adapter driver 244.

While the example embodiment described having a single dedicated physical fibre channel HBA as a primary I/O channel, and having two virtual fibre channel HBAs as the secondary and tertiary failover I/O channels, or paths, alternative embodiments may be configured with differing types of primary HBAs and varying numbers of failover HBAs. For example, an alternative embodiment may have a single virtual fibre channel HBA as the primary I/O channel and associated data path, with a single physical Ethernet HBA, coupled to an iSCSI storage device, as the secondary I/O channel and associated data path.

With the aid of dynamic physical and virtual multipath I/O, apparatus 200 may dynamically move AIX® client 235 or Linux client 230 from one physical server to another without disruption of I/O associated with the client. The movement of the partition may include everything the client partition is executing, that is, all hosted applications. Moving logical partitions between different servers may allow planned maintenance of the server hardware without disruption to services provided by the virtual clients. For example, system administrators may move heavily used logical partitions to larger machines without interruption to the services provided by the partitions. Alternatively, system administrators may move partitions to servers with more available processing power, depending on workload demands or adjust the utilization of server hardware to maintain a specific level of service to users.

A more specific example may illustrate in greater detail how dynamic physical and virtual multipath I/O may enable the relocation of logical partitions. Virtual machine monitor 250 may be configured to distribute the processing power among different logical partitions, such as AIX® client 235 and Linux® client 230. For example, AIX® client 235 may have an allotted 2 processing units and 2 virtual processors while Linux® client 230 also has an allotted 2 processing units and 2 virtual processors. Even further, in this example, AIX® client 235 and Linux® client 230 may both reside on the same server, wherein the server has a total of 4 physical processors.

The demand or total load for AIX® client 235 may increase and with the passage of time. For example, one processor associated with AIX® client 235 may become heavily loaded, executing a large number of instructions relative to the execution capability of the processor. If the system administrator cannot increase the amount of computing power of available to AIX® client 235 on the current server, for example with Linux® client 230 not having any excess processing power to spare, the system administrator may need to move or migrate the logical partition of AIX® client 235 to another server having more processing power available.

In migrating AIX® client 235 to another server, the system administrator may cause apparatus 200 to make a copy of the existing AIX® client 235 in the destination or target server. Once the copy is created, apparatus 200 may deactivate the source image, activate the destination or target image, and remove the deactivated image from the memory of the source server. Upon the migration of AIX® client 235 the dedicated physical HBA may become unavailable during the relocation. For example, because I/O slot 280 and fibre channel card 282 reside in the source server, the AIX® client 235 in the newly created logical partition of the target server may be physically isolated from I/O slot 280 and fibre channel card 282.

Multipath I/O module 240 may detect the unavailability of fibre channel card 282 via physical fibre channel HBA driver 244. Upon the detection, multipath I/O module 240 may cause AIX® client 235 to dynamically switch or failover to one of the virtual I/O paths provided by NPIV adapter driver 244 or NPIV adapter driver 243. While utilizing the failover path, the system administrator may then log into the hardware management console (HMC) for the target server and reconfigure AIX® client 235, replacing the dedicated I/O slot 280 and fibre channel card 282 with another I/O slot and HBA of the target server.

Figure 3:
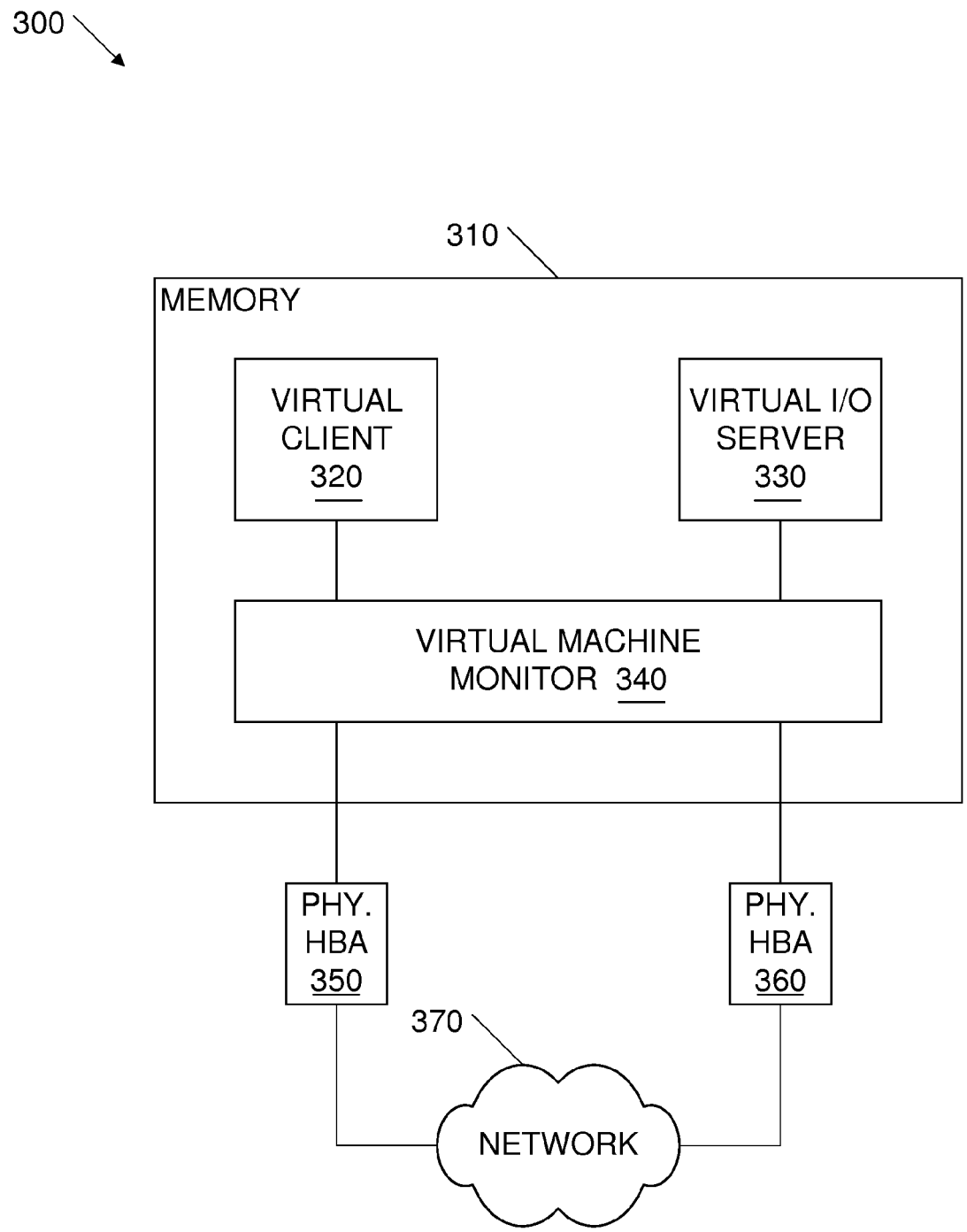
FIG. 3 depicts one embodiment of an apparatus that may dynamically manage multipath I/O between a virtual I/O path and a physical I/O path.

FIG. 3 depicts one embodiment of an apparatus 300 that may perform dynamic management of physical and virtual multipath I/O. One or more elements of apparatus 300 may be in the form of hardware, software, or a combination of both hardware and software. For example, in the embodiment depicted in FIG. 3, the modules of apparatus 300 in memory 310 may comprise software instructions of an application, executed by one or more processors. In other words, apparatus 300 may comprise elements of a computing device coupled to a network 370.

In alternative embodiments, one or more of the modules of apparatus 300 may comprise hardware-only modules. For example, virtual I/O server 330 may comprise a portion of an integrated circuit chip coupled with processors of a computing device, in an arrangement different than that shown in FIG. 3. In such embodiments, virtual I/O server 330 may work in conjunction with virtual machine monitor 340, allowing virtual clients in memory 310 to access I/O devices, such as physical HBA 350 and physical HBA 360.

In even further alternative embodiments, one or more of the modules of apparatus 300 may comprise a combination of hardware and software modules. For example, virtual machine monitor 340 may comprise firmware and a standalone processing circuitry that performs the monitoring and management of virtual clients and logical partitions in memory, enabling the clients and partitions to access I/O hardware.

In one or more embodiments, virtual machine monitor 340 may comprise a thin layer of code in software or firmware that enables dynamic resource sharing. In the embodiment depicted in FIG. 3, virtual machine monitor 340 may enable virtualization and create substitutes for real resources, called virtual resources. For example, virtual machine monitor 340 may allow the creation of many virtual systems within a single physical system. Two virtual systems may comprise, e.g., virtual client 320 and virtual I/O server 330. Virtual machine monitor 340 may create virtual substitutes for physical HBA 350 and physical HBA 360 and enable virtual client 320 and virtual I/O server 330 to interact with the virtual substitutes in an independent manner, preventing conflicts of attempted simultaneous accesses to the actual physical resources.

Virtual client 320 may comprise an image of the desktop computer, which may be referred to as a virtual desktop, stored in a logical partition of memory 310. For example, virtual client 320 may comprise an image of an operating system and a number of applications compatible with the operating system. As a more specific example, virtual client 320 may comprise AIX®, Windows®, Unix®, or some other operating system, executing a CAD program, a mail server program, and a database program.

Virtual I/O server 330 may comprise software that is also located in a logical partition. Virtual I/O server 330 may work in conjunction with virtual machine monitor 340 and enable the sharing of physical I/O resources, such as physical HBA 350 and physical HBA 360, between the various virtual clients in memory 310, one such client being virtual client 320. For example, in numerous embodiments, virtual I/O server 330 may provide virtual SCSI target and shared Ethernet adapter capability to client logical partitions within apparatus 300, enabling the client logical petitions to share SCSI devices and Ethernet adapters.

Physical HBA 350 and physical HBA 360 may comprise one or more of a variety of different adapters. In numerous embodiments the HBAs may comprise fibre channel HBAs, which communicate using fibre channel protocol (FCP) to transport SCSI commands over fibre channel networks. In some embodiments, the HBAs may comprise Internet SCSI-compatible (iSCSI) HBAs. The iSCSI HBAs may employ TCP/IP to enable the exchange of SCSI commands via an IP network. In other words, iSCSI HBAs may emulate a local storage bus over a wide area network to create a SAN. Fibre channel and iSCSI HBAs are just a couple of examples. Alternative embodiments may employ one or more other types of HBAs.

Network 370 may comprise numerous networking devices and one or more storage devices. For example, network 370 may comprise an arrangement of routers, hubs, switches, and cabling, interconnecting a number of iSCSI disks, iSCSI tape drives, iSCSI optical storage devices, fibre channel RAID, fibre channel disks, fibre channel tape drives, fibre channel optical drives, and/or iSCSI RAID storage, as just a few examples. Network 370 may attach and represent the storage devices in such a manner to make the storage devices appear as locally attached. Network 370 may use one or more low-level protocols for communications between servers and storage devices of network 370. For example, different embodiments may use such protocols as ATA over ethernet, FICON mapping over fibre channel, fibre channel over Ethernet, HyperSCSI, ISCSI Extensions for RDMA (iSER), iFCP, and/or iSCSI.

While apparatus 300 executes the operating system and applications of virtual client 320, virtual machine monitor 340 may enable virtual client 320 to send information to and receive information from one or more storage devices of network 370 via dedicated physical HBA 350. That is to say, virtual machine monitor 340 may prevent all other virtual clients from utilizing physical HBA 350.

Virtual machine monitor 340 may also enable virtual I/O server 330 to send information to and receive information from one or more storage devices of network 370 via physical HBA 360. Virtual I/O server 330 may allow multiple virtual clients of apparatus 300 to transfer data to and from network 370.

During operation, physical HBA 350 may encounter a hardware problem, making the dedicated physical path from virtual client 320 to network 370 unavailable. However, virtual client 320 may be configured to detect the failure or unavailability and switch from the primary physical path to one or more virtual paths. In the embodiment of apparatus 300, virtual client 320 may dynamically fail over or switch to the virtual path for network 370 provided by virtual I/O server 330 and physical HBA 360. Dynamically switching from an unavailable path to an alternate available path may increase the uptime and reliability of service of apparatus 300.

In an alternative arrangement or configuration scenario, virtual client 320 may use the virtual path through virtual I/O server 330 and physical HBA 360 as the primary path. Whenever the virtual path becomes unavailable, such as the result of heavy traffic from other virtual clients of apparatus 300, virtual client 320 may fail over to physical HBA 350 and continue exchanging data with the storage device(s) of network 370.

In the example embodiment discussed above, virtual client 320 determined the unavailability of the primary I/O path and switched to the secondary I/O path. In many embodiments such determination and switching may be performed by a module of virtual client 320, such as a multiple I/O path module. In an alternative embodiment the determination of the unavailability and/or the switching may be performed by another element of apparatus 300. For example, in at least one alternative embodiment, virtual machine monitor 340 may be configured with the information pertaining to the primary, secondary, and alternative I/O paths to network 370. In other words, virtual machine monitor 340 may normally route I/O transactions for virtual client 320 through physical HBA 350. If virtual machine monitor 340 were to detect an error associated with physical HBA 350, virtual machine monitor 340 could automatically reroute the I/O transactions through virtual I/O server 330 and physical HBA 360.

The number of modules in an embodiment of apparatus 300 may vary. Some embodiments may have fewer modules than those module depicted in FIG. 3. For example, one embodiment may integrate the functions described and/or performed by virtual I/O server 330 with the functions of virtual machine monitor 340 into a single module. That is to say, an alternative embodiment may have a virtual machine monitor capable of receiving I/O requests from different virtual clients and routing the requests to the appropriate I/O hardware resources.

Further embodiments may include more modules or elements than the ones shown in FIG. 3. For example, alternative embodiments may include one or more multiple I/O path modules, two or more virtual I/O servers, and additional physical HBAs. Even further, in many alternative embodiments, memory 310 may comprise numerous memory modules. For example memory 310 may be spread among multiple servers in a server system. Several servers of the system may comprise one or more virtual clients and/or virtual I/O servers. Virtual machine monitor 340 may reside on a single server or on multiple servers.

Figure 4:
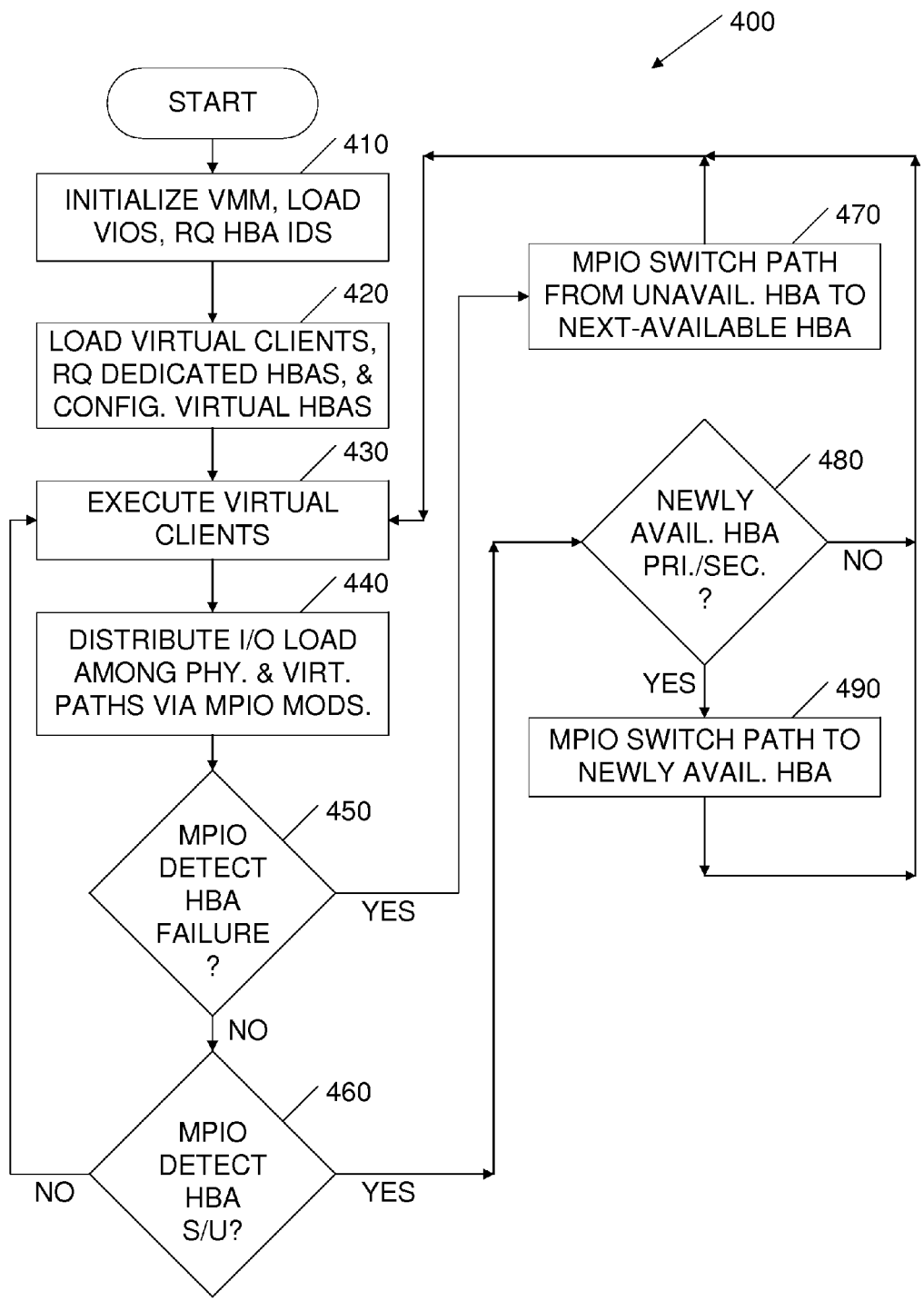
FIG. 4 depicts a flowchart illustrating how a an embodiment may load virtual clients, virtual I/O servers, a virtual machine monitor, and dynamically switch from unavailable HBAs to available HBAs.

FIG. 4 depicts a flowchart 400 of a process illustrating how a system may perform dynamic management of physical and virtual multipath I/O. For example, one or more embodiments may be implemented as a computer program product comprising a computer readable storage medium including instructions that, when executed by a processor route I/O requests from virtual clients directly to physical HBAs or indirectly to physical HBAs via virtual I/O servers. Alternatively, the process of flowchart 400 may be implemented in hardware, such as in a state machine of an ASIC, such as ASIC 124 depicted in FIG. 1. For example, ASIC 124 may comprise a dynamic physical and virtual multipath I/O module that works in conjunction with other hardware of system 100 to dynamically manage multiple paths of physical and virtual I/O resources.

As illustrated in FIG. 4, the process may involve initializing the virtual machine monitor, loading one or more virtual I/O servers, and requesting identification numbers for the HBAs (element 410). For example, apparatus 200 may load virtual machine monitor 250 into memory modules 264, initialize virtual machine monitor 250, load virtual I/O server 210 into memory modules 264, and request NPIV and WWPN numbers for fibre channel cards 254, 258, and 282 from the SAN switches 260 and 290.

Apparatus 200 may then load one or more virtual clients, associate or assign dedicated HBAs, and assign virtual HBAs based on the configuration of the loaded modules (element 420). For example, apparatus 200 may load Linux® client 230 and AIX® client 235 into logical partitions of memory modules 264, dedicate fibre channel card 282 to physical fibre channel HBA driver 244, and assign fibre channel cards 254 and 258 as virtual fibre channel cards to AIX® client 235 via NPIV adapter drivers 225 and 223, respectively. Apparatus 200 may then start executing the operating systems of Linux® client 230 and AIX® client 235, as well as the various applications loaded into each of the respective logical partitions (element 430).

As apparatus 200 executes AIX® client 235, multipath I/O module 240 may be configured to spread the I/O load between physical fibre channel HBA driver 244 and NPIV adapter driver 243 (element 440). During operation, multipath I/O module 240 may detect a failure of SAN switch 260 that affects fibre channel card 258, physical fibre channel HBA driver 220, NPIV adapter driver 223, and NPIV adapter driver 244 (element 450) and switch to the virtual I/O path defined by NPIV adapter driver 242, and NPIV adapter driver 225, physical fibre channel HBA driver 215, and fibre channel card 254 (element 470).

After a technician remedies the problem of SAN switch 260 associated with fibre channel card 258, multipath I/O module 240 may detect that the virtual path of fibre channel card 258 is back online or starts up (element 460), that the newly available fibre channel card 258 is configured to be the secondary path for AIX® client 235 (element 480), and switch back to the virtual I/O path defined by NPIV adapter driver 243, and NPIV adapter driver 223, physical fibre channel HBA driver 220, and fibre channel card 258 (element 490).

Flowchart 400 of FIG. 4 illustrates only one process. Alternative embodiments may implement innumerable variations of flowchart 400. For example, in addition to detecting a single failure associated with fibre channel card 258, multipath I/O module 240 may also have detected that the failure of SAN switch 260 also caused a failure associated with fibre channel card 254, making the failover virtual I/O path associated with NPIV adapter driver 242 also unavailable (element 450). Consequently, multipath I/O module 240 may have been configured to switch to the next available virtual I/O path, which could have been for another virtual port of virtual I/O server 210 or to a different virtual port for a different physical fibre channel card associated with another virtual I/O server (element 470).

Figure 5:
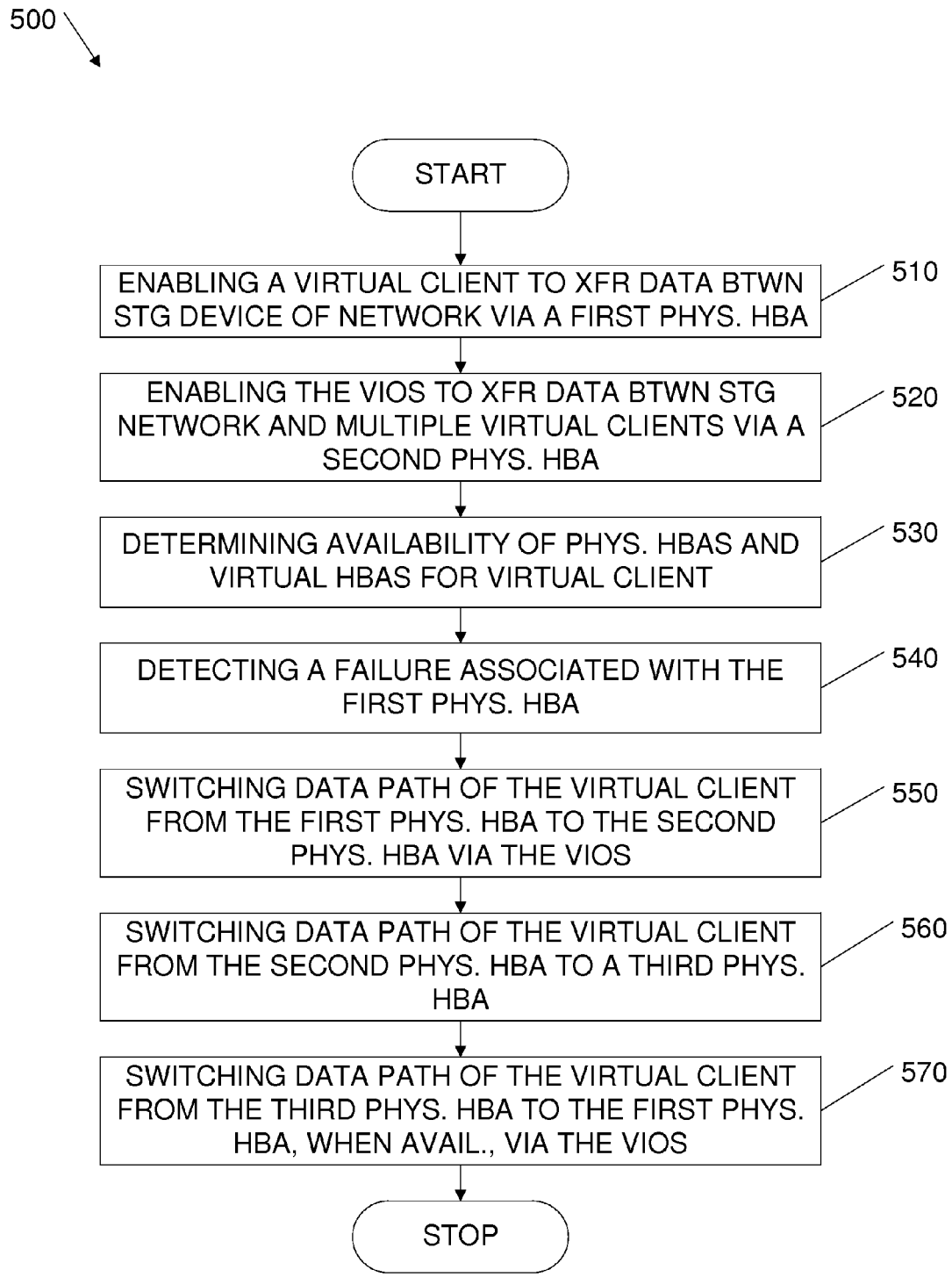
FIG. 5 illustrates a flowchart of a method for dynamically managing physical and virtual multipath I/O.

FIG. 5 illustrates a flowchart 500 of a method for dynamically managing physical and virtual multipath I/O. For example, an alternative embodiment of apparatus 200 shown in FIG. 2 may have one virtual I/O path associated with a fibre channel card, or HBA, coupled to virtual I/O server 210, as well as another virtual I/O path associated with an iSCSI HBA to a different virtual I/O server. In other words, an alternative embodiment of apparatus 200 may have two virtual I/O servers, one coupled with a fibre channel HBA and one coupled with an iSCSI HBA.

As the alternate embodiment of apparatus 200 operates, virtual machine monitor 250 may enable AIX® client 235 to transfer data between one or more storage devices of SAN 270 via the virtual I/O path defined by the iSCSI HBA (element 510). Also as apparatus 200 operates, virtual machine monitor 250 may enable Linux® client 230 and any other virtual clients of apparatus 200 to transfer data to and from SAN 270 via virtual I/O server 210 (element 520).

During operation of apparatus 200, multipath I/O module 240 may monitor the statuses of the physical and virtual I/O data paths associated with AIX® client 235, such as monitoring for any errors reported by the HBAs, network switches, or storage devices of the storage area network coupled to fibre channel card 282, the fibre channel HBA coupled to virtual I/O server 210, and the iSCSI HBA coupled to the other virtual I/O server (element 530). For example, a storage device coupled with the iSCSI card or HBA may return an I/O error associated with an attempted I/O transaction of AIX® client 235. In response to detecting the error or failure (element 540), multipath I/O module 240 may switch the virtual data path associated with the failed iSCSI HBA and virtual I/O server over to the secondary virtual I/O server and fibre channel HBA (element 550).

An embodiment of flowchart 500 may continue by having multipath I/O module 240 switch from the virtual data path associated with the fibre channel HBA to a dedicated physical HBA, configured as an alternate HBA (element 560). Multipath I/O module 240 may continue monitoring the statuses of the physical and virtual I/O data paths configured for AIX® client 235, such as the iSCSI HBA and the fibre channel HBA. If and/or when the previously failed device(s) come back online, multipath I/O module 240 may detect the change in availability and switch the associated I/O data path for AIX® client 235 back to the newly available HBA. For example, the storage device coupled with the iSCSI HBA which previously returned the I/O error may send a signal that the device has resumed normal operation, whereupon multipath I/O module 240 may switch from the alternate dedicated physical HBA back to the virtual I/O path associated with the iSCSI HBA (element 570).

Another embodiment is implemented as a program product for implementing systems, methods, and apparatuses described with reference to FIGS. 1-5. Embodiments may contain both hardware and software elements. One embodiment may be implemented in software and include, but is not limited to, firmware, resident software, microcode, etc.

Furthermore, embodiments may take the form of a computer program product accessible from a computer-usable or computer-readable medium providing program code for use by or in connection with a computer or any instruction execution system. For the purpose of describing the various embodiments, a computer-usable or computer readable medium may be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk read only memory (CD-ROM), compact disk read/write (CD-R/W), and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code is retrieved from bulk storage during execution. Input/output or I/O devices (including but not limited to keyboards, displays, pointing devices, etc.) can be coupled to the system either directly or through intervening I/O controllers.

Those skilled in the art, having the benefit of this disclosure, will realize that the present disclosure contemplates dynamic management of physical and virtual multipath I/O. The form of the embodiments shown and described in the detailed description and the drawings should be taken merely as examples. The following claims are intended to be interpreted broadly to embrace all variations of the example embodiments disclosed.

Although the present disclosure and some of its advantages have been described in detail for some embodiments, one skilled in the art should understand that various changes, substitutions, and alterations can be made herein without departing from the spirit and scope of the disclosure as defined by the appended claims. Although specific embodiments may achieve multiple objectives, not every embodiment falling within the scope of the attached claims will achieve every objective. Moreover, the scope of the present application is not intended to be limited to the particular embodiments of the process, machine, manufacture, composition of matter, means, methods, and steps described in the specification. As one of ordinary skill in the art will readily appreciate from this disclosure, processes, machines, manufacture, compositions of matter, means, methods, or steps presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
    a computer enabling a virtual client to transfer data between a storage network and the virtual client via a first physical host bus adapter (HBA), wherein the virtual client resides in a first logical partition (LPAR);
    the computer enabling a virtual I/O server to transfer data between the storage network and the virtual I/O server via a second physical HBA, wherein the virtual I/O server resides in a second LPAR;
    the computer enabling a virtual machine monitor to provide inter-partition communication between the first LPAR and the second LPAR, wherein the inter-partition communication enables virtualization functionality of the second physical HBA for the virtual client, and wherein the virtualization functionality is via remote direct memory access (RDMA) services of the virtual machine monitor; and
    the computer enabling, dynamically, the virtual client to transfer data between the storage network and the virtual client via the virtual I/O server and the second physical HBA.

2. The method of claim 1, further comprising: the computer enabling the virtual I/O server to transfer data between the storage network and a second virtual client via the second physical HBA, wherein the second virtual client resides in a third LPAR, and wherein the second virtual client comprises a driver that supports N_Port ID virtualization (NPIV).

3. The method of claim 2, further comprising: the computer obtaining multiple NPIV addresses for the second physical HBA for a plurality of virtual clients, wherein the virtual I/O server comprises a second device driver that supports NPIV.

4. The method of claim 3, further comprising: the computer detecting a failure associated with the first physical HBA to enable the virtual client to transfer data via the second physical HBA.

5. The method of claim 1, further comprising: the computer determining, via a multipath I/O module, to transfer data between the storage network and the virtual client via the virtual I/O server and the second physical HBA in response to the first HBA becoming unavailable to the virtual client.

6. The method of claim 1, further comprising: the computer enabling, dynamically, the virtual client to transfer data between the storage network and the virtual client via the virtual I/O server and a third physical HBA in response to the second HBA becoming unavailable to the virtual client, wherein one of the first physical HBA, the second physical HBA, and the third physical HBA comprises a fibre channel HBA and a second one comprises an iSCSI HBA.

7. An apparatus, comprising:
    a virtual client module to transfer data to a network via a first physical host bus adapter (HBA), wherein the virtual client module resides in a first logical partition (LPAR);
    a virtual I/O server module to transfer data to the network via a second physical HBA, wherein the virtual I/O server module resides in a second LPAR; and
    a virtual machine monitor configured to couple the virtual client module to the virtual I/O server module, wherein the virtual machine monitor is configured to provide inter-partition communication between the first LPAR and the second LPAR, and wherein the virtual machine monitor is configured to provide remote direct memory access (RDMA) services for the first LPAR and the second LPAR, and wherein the virtual I/O server is configured to enable the virtual client module to access the second physical HBA as a virtual HBA via the inter-partition communication, and wherein at least one of the virtual I/O server module and the virtual machine monitor is configured to dynamically enable the virtual client module to transfer data to the network via the second physical HBA.

8. The apparatus of claim 7, further comprising: a multipath I/O module configured to detect availability of the first physical HBA and the second physical HBA, wherein the virtual client module comprises a first driver that supports N_Port ID virtualization (NPIV), and wherein the virtual I/O server module comprises a second driver that supports NPIV.

9. The apparatus of claim 8, wherein the virtual client module comprises the multipath I/O module, and wherein the multipath I/O module is configured to select between the first physical HBA and the second physical HBA based on the detected availability.

10. The apparatus of claim 8, wherein the multipath I/O module is configured to spread I/O workload of the virtual client module between the first physical HBA and the second physical HBA, and wherein the virtual machine monitor comprises a hosted virtual machine monitor.

11. The apparatus of claim 7, further comprising: a second virtual I/O server module to transfer data to the network via a third physical HBA, wherein the virtual client module is configured to dynamically transfer data to the network via the second virtual I/O server module and the third physical HBA upon unavailability of the first physical HBA and the second physical HBA.

12. The apparatus of claim 11, wherein the second virtual I/O server module comprises a multipath I/O module to transfer data to the network via a fourth physical HBA, and wherein the second virtual I/O server module is configured to dynamically transfer data to the network via the fourth physical HBA upon unavailability of the third physical HBA.

13. The apparatus of claim 7, wherein the virtual machine monitor is configured to dynamically enable the virtual client module to transfer data to the network via the second physical HBA in response to detection of a failure associated with the first physical HBA.

14. The apparatus of claim 7, wherein the second physical HBA comprises a fibre channel HBA capable of supporting NPIV.

15. A computer system, comprising:
    one or more processors, one or more computer-readable memories and one or more computer-readable, tangible storage devices;
    program instructions, stored on at least one of the one or more storage devices for execution by at least one of the one or more processors via at least one of the one or more memories, which comprise a virtual client module configured to transfer data to a storage area network (SAN) via a first fibre channel host bus adapter (HBA), and wherein the virtual client module resides in a first logical partition (LPAR);

program instructions, stored on at least one of the one or more storage devices for execution by at least one of the one or more processors via at least one of the one or more memories, which comprise a virtual I/O server module configured to transfer data to the SAN via a second fibre channel HBA, wherein the virtual I/O server module resides in a second LPAR; and program instructions, stored on at least one of the one or more storage devices for execution by at least one of the one or more processors via at least one of the one or more memories, which comprise a virtual machine monitor configured to couple the virtual client module to the virtual I/O server module, wherein the virtual machine monitor is configured to provide inter-partition communication between the first LPAR and the second LPAR, and wherein the virtual machine monitor is configured to provide remote direct memory access (RDMA) services for the first LPAR and the second LPAR, and wherein the virtual I/O server module is configured to enable the virtual client module to access the second fibre channel HBA as a virtual fibre channel HBA via the inter-partition communication, and wherein the virtual client module comprises a multipath I/O module to dynamically enable the virtual client module to transfer data to the SAN via the first fibre channel HBA upon a failure of the second fibre channel HBA.

16. The computer system of claim 15, wherein the virtual I/O server module is configured to dynamically allocate physical I/O resources between the virtual client module and other client modules, and wherein the virtual machine monitor comprises a native virtual machine monitor.

17. The computer system of claim 15, wherein the virtual machine monitor is configured to dynamically allocate processing capability of the one or more processors among the virtual client module and other virtual client modules based upon workloads of the virtual client module and the other virtual client modules.

18. The computer system of claim 15, wherein the virtual I/O server module is configured to support parallel a SCSI HBA, an iSCSI HBA, a SCSI RAID hard disk, and an optical storage device.

19. The computer system of claim 15, wherein the virtual client module comprises a first driver that supports N_Port ID virtualization (NPIV) and the virtual I/O server module comprises a second driver that supports NPIV.

20. The computer system of claim 15, wherein the computer system is configured to enable a user to move, dynamically, the virtual client module from the first LPAR of a first size to a third LPAR of a second size.

21. A computer program product comprising:
one or more non-transitory computer-readable storage mediums;
program instructions, stored on at least one of the one or more storage devices, to transfer data to a network of storage devices via a first physical host bus adapter (HBA), wherein the program instructions to transfer data to the network of storage devices via the first physical HBA reside in a first logical partition (LPAR);
program instructions, stored on at least one of the one or more storage devices, to transfer data to the network via a second physical HBA, wherein the program instructions to transfer data to the network via the second physical HBA reside in a second LPAR, and wherein the program instructions to transfer data to the network via the second physical HBA comprise a virtual HBA configured to transfer data to the network via the second physical HBA for a plurality of virtual clients, and wherein each client of the plurality of virtual clients resides in a separate LPAR; and
program instructions, stored on at least one of the one or more storage devices, to enable, dynamically, a virtual client of the plurality to access the network via one of the first physical HBA and the second physical HBA upon a failure of the one of the first physical HBA and the second physical HBA, wherein the program instructions to enable the virtual client of the plurality to access the network comprise program instructions to provide inter-partition communication between the first LPAR and the second LPAR and comprise program instructions to provide remote direct memory access (RDMA) services for the first LPAR and the second LPAR, and wherein data transfer of the virtual HBA is via the inter-partition communication and the RDMA services.

22. The computer program product of claim 21 further comprising program instructions, stored on at least one of the one or more storage devices, to obtain multiple identifiers for the second physical HBA from the network to enable the plurality of clients to each transfer data to the network.

23. The computer program product of claim 22 wherein the program instructions to obtain multiple identifiers obtain multiple world wide World-Wide Port Names (WWPNs) and fibre channel addresses.

24. The computer program product of claim 23 further comprising program instructions, stored on at least one of the one or more storage devices, to enable the virtual client to be dynamically moved from the first LPAR to a third LPAR.

* * * * *